United States Patent
Decaluwe et al.

(10) Patent No.: US 8,517,957 B2
(45) Date of Patent: Aug. 27, 2013

(54) EAR TAG FOR MARKING AN ANIMAL AND FOR SAMPLING TISSUE FROM SAID ANIMAL

(75) Inventors: Johan Decaluwe, Laval (FR); Jérôme Gaschet, Vitre (FR)

(73) Assignee: Allflex Europe SAS, Vitre Cedex (FR)

( * ) Notice: Subject to any disclaimer, the term of this patent is extended or adjusted under 35 U.S.C. 154(b) by 0 days.

(21) Appl. No.: 12/738,379

(22) PCT Filed: Aug. 8, 2008

(86) PCT No.: PCT/EP2008/006578
§ 371 (c)(1),
(2), (4) Date: Jul. 19, 2010

(87) PCT Pub. No.: WO2009/049706
PCT Pub. Date: Apr. 23, 2009

(65) Prior Publication Data
US 2010/0286556 A1    Nov. 11, 2010

(30) Foreign Application Priority Data
Oct. 18, 2007  (EP) .................................... 07301479

(51) Int. Cl.
*A61B 5/00* (2006.01)
(52) U.S. Cl.
USPC ........................................................ 600/567
(58) Field of Classification Search
USPC .................................................. 600/562–567
See application file for complete search history.

(56) References Cited

U.S. PATENT DOCUMENTS

| 4,635,389 | A  | 1/1987 | Oudelette |
| 6,659,338 | B1 | 12/2003 | Dittmann et al. |
| 6,666,170 | B1 | 12/2003 | Hilpert |
| 7,005,459 | B2 * | 2/2006 | Hekal ............................ 523/102 |
| 2005/0228310 | A1 * | 10/2005 | Pfistershammer ............ 600/567 |

FOREIGN PATENT DOCUMENTS

| CN | 1309756 | 8/2001 |
| DE | 10139493 | 1/2003 |
| EP | 0177201 | 4/1986 |
| EP | 0913081 | 5/1999 |
| EP | 1014861 | 7/2000 |
| EP | 1037525 | 9/2000 |
| EP | 1088212 | 4/2001 |
| EP | 1372379 | 1/2004 |
| EP | 1920651 | 5/2008 |
| WO | WO 95/25426 | 9/1995 |
| WO | WO 97/32663 | 9/1997 |
| WO | WO 99/61855 | 12/1999 |
| WO | WO 99/61882 | 12/1999 |
| WO | WO 02080661 | 10/2002 |
| WO | WO 2004/010773 | 2/2004 |
| WO | WO 2005/079562 | 9/2005 |

OTHER PUBLICATIONS

International Search Report for International Application No. PCT/EP2008/006578 mailed on Dec. 19, 2008.
Office Action issued Dec. 23, 2011 in counterpart Chinese Patent Application No. CN 200880111880.2.

* cited by examiner

*Primary Examiner* — Max Hindenburg
(74) *Attorney, Agent, or Firm* — Pearl Cohen Zedek Latzer, LLP

(57) ABSTRACT

The present invention relates to an ear tag (1) for marking an animal and for sampling tissue from said animal.

25 Claims, 5 Drawing Sheets

EAR TAG FOR MARKING AN ANIMAL AND FOR SAMPLING TISSUE FROM SAID ANIMAL

CROSS-REFERENCE TO RELATED APPLICATIONS

Figure 1:
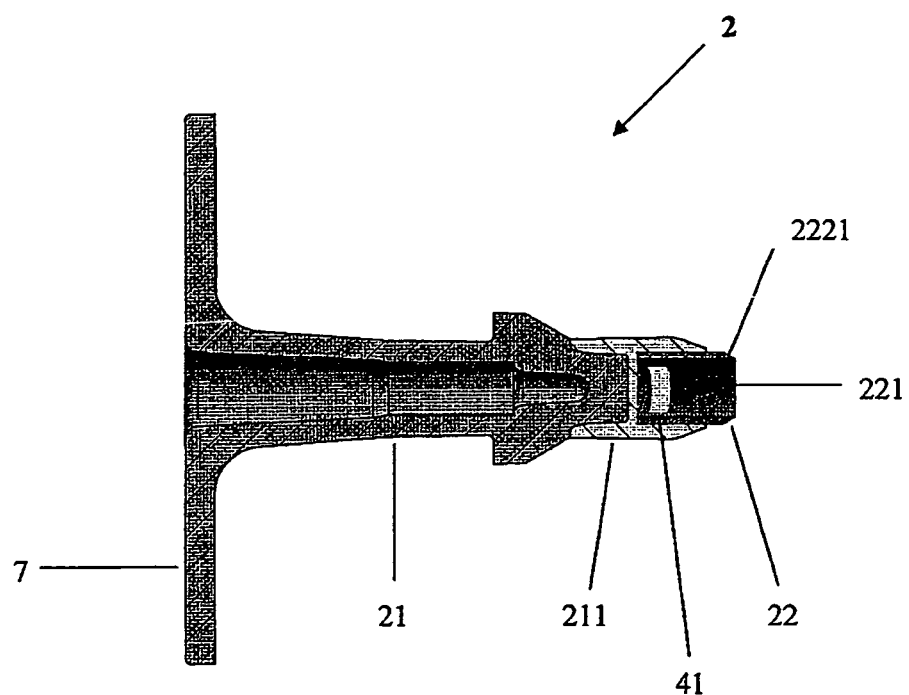

This application is a National Phase Application of PCT International Application No. PCT/EP2008/006578, International Filing Date Aug. 8, 2008, claiming priority of European Patent Application No. 07301479.7, filed Oct. 18, 2007, which is incorporated herein by reference.

The present invention relates to an ear tag for marking an animal and for sampling tissue from said animal.

Moreover, the present invention relates to a method of applying an ear tag to an animal and taking a sample from said animal using said ear tag or components thereof.

In recent years the marking of live stock animals, such as cattle, pigs or sheep, has become mandatory in many parts throughout the world. This is usually achieved by applying an ear tag to one or two ears of the animal which ear tag bears identifying means that allow the individual identification of the animal. Numerous types of ear tags exist, all of which comprise a female or receiving part and a male or piercing part. For application, the animal's ear is brought in-between the male and female part which, by means of a pair of applicator pliers, are punched together through the ear of the animal. Once fitted, the ear tag should be impossible to remove, i.e. it should be forgery-proof. To this end, a number of locking-mechanisms have been devised which aid in retaining the male part in the female part once the two parts have been assembled together at the animal's ear.

EP 0177201, EP 0913081, WO 95/25426 and EP 1037525 describe locking mechanisms in the form of a retaining ring, retaining barbs and/or a retaining clip that lock the male part in the female part once the ear tag has been assembled.

Furthermore, it is becoming increasingly important not to only be able to identify an animal by means of the corresponding tag but also to be able to sample a piece of tissue of the animal marked with the ear tag and, at a later stage, be able to attribute this sample from which a number biological/biochemical characteristics have been determined, to the corresponding animal.

EP 1014861 describes a device for withdrawing biological sample which comprises a test capsule having a sample container and a test capsule cover. The sample container and the test capsule cover form part of an ear tag which is applied at the same time the test capsule containing a sample is formed and closed. The test capsule thus formed bears the same labeling information as the ear tag that has been applied but can be separated therefrom. The sample contained in the test capsule is subsequently amenable to further laboratory testing such as might be required for determining the disease status or immunological status of the animal.

EP 1088212 describes a device for obtaining and preparing tissue samples for molecular genetic diagnosis. The device has a sample receiving container and sample collecting means which means enters the sample receiving container after collecting the sample and tightly seals it. Within the sample receiving container, there are means to protect from DNA-degrading enzymes. The sample collecting means is pressed through the ear of an animal and into the sample receiving container which itself is associated with an ear tag comprising a spike plate and an aperture plate. The sample collecting container is releasably connected with the aperture plate and may therefore be withdrawn after the sample has been taken, whereas the ear tag remains in the animal's ear.

EP 1372379 describes an ear tag for marking animals with an organic substance sampling system. In this ear tag, the male part is configured in two separable elements. The first of these two elements remains in the female part of the ear tag once the ear tag has been applied, whereas the other element is used for sampling organic matter and can be moved back and forth within the first element.

The disadvantage of EP 1014861 and EP 1088212 is that the samples thus produced are tightly and securely stored within the respective test capsule produced. Further laboratory procedures require a tedious opening of the tightly closed test capsule. This requires the application of extensive force or the employment of specific instruments for that purpose and makes the entire procedure lengthy and cumbersome.

In some of the commercially available products, there is a sample container present into which a tissue sample is introduced upon application of the ear tag. As outlined above, such sample container forms part of a test capsule which becomes detached upon application of the ear tag. In some instances, this sample container additionally comprises a drying agent or some preserving agent, which is usually present in a powder form. Such a drying agent may for example be a powdered silica gel. Such preserving agents are necessary to preserve the tissue sample for extended periods of time, and yet, they may interfere with the further handling of the tissue sample in that they may get mixed with the tissue sample, or they may interfere with certain laboratory procedures that are subsequently performed on the tissue sample.

Consequently, it was an object of the present invention to provide for an ear tag which allows the sampling of a tissue sample and the subsequent preservation thereof for extended periods of time without interfering with the tissue sample or laboratory procedures subsequently performed on the tissue sample.

The objects of the present invention are solved by an ear tag (1) for marking an animal and for sampling tissue from said animal, comprising a male part (2) and a female part (3), said male part having a stem (21) and a tip (211) of said stem, said female part having a receiving portion (31) for receiving said tip and at least parts of said stem upon application of the ear tag, said ear tag further comprising sample collecting means (22) and, optionally, a sample container (32), wherein said sample collecting means is detachably associated with said male part prior to application of the ear tag, and wherein said sample container, if present, is detachably associated with said female part prior to application of the ear tag, and wherein said sample collecting means has a first interior space (221) for receiving a tissue sample, and said sample container, if present, has a second interior space (321) for receiving a tissue sample, and wherein said sample collecting means is configured such that it becomes pressed into or through tissue of an animal upon application of the ear tag to generate a tissue sample, characterized in that said ear tag, prior to application, further comprises a desiccant portion (4), said desiccant portion being associated with said sample collecting means or said sample container, said desiccant portion being made from a desiccant material shaped into a solid desiccant body (41), further characterized in that, after application of the ear tag and sampling of tissue from the animal, said solid desiccant body and said sample collecting means, or said solid desiccant body and said sample container, are arranged such that at least one of said first interior space and said second interior space is exposed to said solid desiccant body, thereby allowing the desiccation of a tissue sample present within said first interior space or said second interior space.

In one embodiment, said solid desiccant body is a unitary solid desiccant body.

In one embodiment, said solid desiccant body is not a powder of desiccant material and not a plurality of grains of desiccant material.

In one embodiment, said solid desiccant body is formed from a mixture of a binder and a desiccant material, wherein, preferably, said binder is a polymer, and said desiccant material is entrained in said polymer, and wherein, more preferably, said polymer is a naturally occurring polymer, such as starch, cellulose, or a modified form thereof, such as pregelatinized starch, or is a thermoplastic polymer, preferably a polyolefin, such as polypropylene, polyethylene, or a polycarbonate or a polyamide.

Preferably, said polymer is a thermoplastic polymer and wherein said solid desiccant cant body is formed from said thermoplastic polymer, said desiccant material and additionally a channeling agent, wherein said channeling agent is an agent that allows for access of moisture to said desiccant material within said thermoplastic polymer.

In one embodiment, said channeling agent is selected from polyglycol, glycerol, ethylene vinyl alcohol and polyvinyl alcohol.

In one embodiment, said desiccant material is an anhydrous salt or a material having capillary morphology, such as silica gel, a molecular sieve, a clay.

Preferably, said solid desiccant body has a curved shape or a tubular shape or a shape matching said first or said second interior space, preferably matching said first or said second interior space so as to fit into said first or said second interior space.

In one embodiment, said solid desiccant body lines all or parts of said first interior space, or lines all or parts of said second interior space.

In one embodiment, said solid desiccant body is integrated in said sample collecting means as an integral portion thereof, or is integrated in said sample container as an integral portion thereof, or wherein said solid desiccant body is formed as an insert which lines all or part of said first interior space or of said second interior space, wherein, preferably, said solid desiccant body is integrated in said sample collecting means or in said sample container, as a portion which does not come into direct physical contact with a tissue sample present in said sample collecting means or in said sample container, or wherein said insert does not come into direct physical contact with a tissue sample present in said sample collecting means or in said sample container.

In a preferred embodiment, the ear tag has said sample collecting means and said sample container as defined above, wherein said sample container, prior to application of said ear tag, is associated with said female part in a detachable manner such that, upon application of said ear tag by introducing said tip and at least parts of said stem of said male part into said receiving portion of said female part, said sample collecting means is pressed into or through tissue of an animal thereby generating a tissue sample, and is further pressed into said sample container such that said tissue sample is introduced into said sample container, whereupon said sample container becomes detached from said female part of said ear tag, and wherein said sample container has side-walls (322) and a bottom (323), and said solid desiccant body is integrated into said side walls and/or said bottom of said sample container as an integral part thereof remote from where said tissue sample has been introduced into said sample container, or said solid desiccant body is formed as an insert which lines a part of said second interior space remote from where said tissue sample has been introduced into said sample container.

In another embodiment, said ear tag has said sample collecting means but not said sample container as defined above, wherein said sample collecting means, prior to application of said ear tag, is associated with said male part in a detachable manner such that upon application of said ear tag by introducing said tip and at least parts of said stem of said male part into said receiving portion of said female part, said sample collecting means is pressed into or through tissue of an animal, thereby generating a tissue sample within said first interior space and, after application of said ear tag, said sample collecting means is detached from said male part together with said tissue sample within said first interior space by withdrawing it therefrom, said sample collecting means having a front end (222) and a back end (223), said front end having a sharp edge (2221), said sharp edge being configured to cut into tissue and generate a tissue sample which is received in said first interior space when said sample collecting means is pressed into and/or through tissue, said back end being a reservoir (223) for containing a desiccant, said reservoir being or comprising said desiccant portion as defined above.

Preferably, said reservoir (223) has side-walls (2231) and a bottom (2232) defining a third interior space (2211) which is a subset of said first interior space (221), and said solid desiccant body is integrated into said side-walls of said reservoir and/or said bottom of said reservoir, or said solid desiccant body is formed as an insert which lines all or part of said third interior space, or said solid desiccant body makes up said reservoir.

More preferably, said front end (222) of said sample collecting means is a hollow needle (222) having side-walls, a first end (2223) and a second end (2224), said hollow needle being attached to said reservoir with said first end at a first wall (2231) of said reservoir, said hollow needle having a sharp edge (2221) at said second end, which sharp edge is identical with said sharp edge (2221) of said front end of said sample collecting means, said hollow needle further having a hollow interior (2225) ending in a first opening (2226) and a second opening (2227) at said first end and second end, respectively, wherein said first wall of said reservoir comprises a first wall area (22311) that is configured so as to be pierced through by said first end of said hollow needle upon pressing said sample collecting means into tissue.

Preferably, said first wall area
has a thickness which is at least partially smaller than other wall areas (22332, 22332') adjacent to or surrounding said first wall area, or
is weakened, e.g. by perforation or by a groove or by a side to be ruptured by said first end of said hollow needle.

More preferably, said hollow needle is attached with said first end to said reservoir at said first wall of said reservoir by means of a fixing part (23), said fixing part having a channel (231) extending from said first wall and ending in an orifice (232), said channel having dimensions so as to hold a first part (2228) of said hollow needle including said first end of said hollow needle, said hollow needle being held at said first part by said channel.

Preferably, said channel has an inner diameter that matches an outer diameter of said hollow needle at said first part of said hollow needle, wherein said hollow needle, at said first part, frictionally engages with said channel, and, upon pressing said sample collecting means into tissue, is moved with its first end towards said first wall area and pierces through said first wall area by means of said first end.

In one embodiment, said reservoir and said fixing part are made from plastic, e.g. by molding.

Preferably, said first wall is made from plastic and is also made by molding during the molding of the reservoir, or said first wall is made from a thin foil, e.g.

aluminum foil, and is applied to said reservoir after production, e.g. molding, of said reservoir.

In one embodiment, said fixing part is made integral with said reservoir.

In one embodiment, said fixing part is made separately from said reservoir and is connected thereto in a second step, for example by gluing or heat-welding.

In one embodiment, said hollow needle is made from metal.

In one embodiment, said hollow needle has a longitudinal axis extending between said first end and said second end, said longitudinal axis being perpendicular to said first wall of said reservoir.

In one embodiment, said hollow needle is being held perpendicular to said first wall of said reservoir by means of said channel of said fixing part.

In a preferred embodiment, said hollow needle comprises an insert body (6) in its hollow interior which frictionally engages with said side-walls of said hollow needle but which can be moved within and out of said hollow interior upon exertion of pressure to said insert body, thereby also moving a tissue sample, present within said hollow interior, within and out of said hollow interior of said needle, wherein, preferably, said insert body has a longitudinal axis which is parallel to said longitudinal axis of said hollow needle, as defined in claim 26, and wherein said insert body has a cross-section perpendicular to said longitudinal axis which cross-section allows liquid to pass through said hollow needle from said first end to said second end, for example liquid for further processing said tissue sample.

Preferably, said cross-section is circular or semi-circular or oval or cross-shaped.

In one embodiment, said insert-body has the shape of a cylinder having a circular or oval cross-section or has the shape of a column having a cross-shaped or X-shaped or star-shaped cross-section.

The objects of the present invention are also solved by a method of applying an ear tag to an animal and taking a sample from said animal, comprising the steps:

providing a male and a female part of an ear tag as defined above, applying said male and female part to an ear of an animal and applying thus an ear tag in said ear and thereby obtaining a tissue sample, either in the first interior space of said sample collecting means, preferably in the hollow interior of said hollow needle of said sample collecting means, or in the second interior space of said sample container, either, detaching said sample container including said tissue sample from said female part, or, withdrawing said sample collecting means, preferably said hollow needle from said male part of said ear tag.

The inventors have surprisingly found that by providing for a desiccant portion which is made from a desiccant material that is shaped into a solid desiccant body, and by arranging the solid desiccant body either with the sample collecting means or with the sample container, it is possible to have the desiccant exert its preserving and drying effect on a tissue sample present within said sample collecting means or said sample container whilst, at the same time, avoiding the interference commonly encountered with the processing agents, such as drying agents, that are present in the sample container or the sample collecting mean in a loose form, such as a powder or a plurality of grains of desiccant, as is the case with the commercially available ear tags. In other words, according to the present invention, a desiccant material is provided in the form of a unitary desiccant body which exerts its desiccant effect on a tissue sample without actually making physical contact with the tissue sample.

As used herein, the term "unitary solid desiccant body" is meant to refer to a body made from a desiccant material having fixed contours and a shape that do not disintegrate or disappear upon movement of the body, for example by shaking or vibrating. As used herein, such term is used as an opposite to a "powder of desiccant materials" or "a plurality of loose grains of desiccant material". A "unitary solid desiccant body" does not disintegrate at room temperature, standard humidity conditions and normal atmospheric pressure, upon shaking or vibration.

There are many ways of preparing such a solid desiccant body which are known to a person skilled in the art. For example, a desiccant material may be mixed with a binder material and pressed into the desired shape. The binder material may for example be a polymer which becomes entrained with the desiccant material and shaped into the desired shape. Examples for polymers suitable for this purpose are naturally occurring polymers, modified forms thereof or thermoplastic polymers. If thermoplastic polymers are used, the methods disclosed in EP 0 892 673 B1, EP 0 824 480 B2 and U.S. Pat. No. 5,911,937 may be used. In preferred embodiments, where a thermoplastic polymer is used, there may additionally be a channeling agent present which channeling agent allows that moisture gains access to the desiccant material within the thermoplastic polymer, despite the fact that the thermoplastic polymer as such is moisture resistant or moisture impermeable. Examples of suitable thermoplastics are selected from the following groups: polyolefin, such as polyethylene, polypropylene, polycarbonate, polyamide, ethylene-vinyl acetate copolymer, ethylene-methacrylate copolymer, polyvinylchloride, polystyrene, polyester, polyesteramide, polyacrylic ester, polyvinylidene chloride, acrylic, polyurethane, and polyacetyl. These and other thermoplastics may be used singularly or in combinations. The thermoplastic polymer forms a matrix into which the desiccant material is blended in. Because the thermoplastic polymer as such is impeding the uptake of moisture through the desiccant, if such desiccant is enclosed within the polymer, the addition of a so called "channeling agent" may be helpful. Examples of channeling agents useful in accordance with the present invention are disclosed in EP 0 892 673 B1 and include hydrophilic materials, preferably polar compounds having at least several hydroxy groups, more preferably polyglycol, glycerol, ethylene-vinyl alcohol and polyvinyl alcohol.

Preferably, the solid desiccant body in accordance with the present invention is located in a position within the sample collecting means or the sample container such that there respective interior spaces, i.e. the "first interior space" or the "second interior space" are exposed to the solid desiccant body, because it is in these spaces that any tissue sample will reside.

The term "the first interior space is exposed to said solid desiccant body", as used herein, is meant to refer to an arrangement in which the solid desiccant body may exert its desiccant effect on the first interior space and anything located therein, including a tissue sample, without having the solid desiccant body actually contacting the tissue sample. In other words, the atmosphere or air present within said interior space must be exposed to said solid desiccant body. There are various ways of achieving this. For example the solid desiccant body may be located in the sample container, either as an insert that lines parts of the interior of said sample container or as part of the walls or bottom of the sample container. Alternatively, the solid desiccant body may be part of the sample collecting means, either as an insert within said sample collecting means or as an integrated portion thereof, for example in a wall of said sample collecting means. In a particularly preferred embodiment, the sample collecting means additionally comprise a reservoir located at the back end which may contain the solid desiccant body as an insett or be the solid desiccant body itself.

Such a preferred embodiment is for example disclosed in Allflex' earlier patent applications FR 0608800 filed on Oct. 6, 2006, and PCT/EP2007/060353 filed on Oct. 1, 2007 which are incorporated herein in their entirety by reference thereto. In this embodiment, the inventors have attached a reservoir of a preserving agent to one end of a hollow needle, such as a biopsy needle, which arrangement as such act as a sample collecting means that can be used for sampling during application of an ear tag. It should be noted that this embodiment does not involve the presence of a sample container associated with a female part. This embodiment combines an instant and easy accessibility to the sample with a long sample half life and without interference of the desiccant with the tissue sample. To this end, the reservoir for a chemical for sample processing, for example for a desiccant agent, is equipped with a region within one of its walls that is intended to be broken by the end of the hollow needle which is adjacent to it, whereby the interior of the reservoir containing the desiccant comes into communicating contact with the sample contained at the other end of the hollow needle. Such "communicating contact" is another expression for describing that an "interior space is exposed to said solid desiccant body". The region intended to be broken is herein also sometimes referred to as a first wall area. Through the piercing agent of the end adjacent to this first wall area, the interior of the reservoir and the interior of the hollow needle become effectively connected, and the desiccant material can exert its desiccant action also on the sample contained in the hollow interior of the hollow needle.

Such sophisticated piercing action is not necessary in those embodiments wherein the solid desiccant body is already integrated part of the sample container or the sample collecting means, wherein the interior space of said sample container or of said sample collecting means is already exposed to said solid desiccant body.

In this application, a number of reference signs are used which are listed as follows:

1 ear tag
2 male part
21 stem of male part or shaft of male part (=25)
211 tip of stem or distal end of shaft (=251)
22 sample collecting means
221 first interior space
2211 third interior space defined by side-walls 2231 and bottom 2232 of reservoir
222 front end of sample collecting means or hollow needle
2221 sharp edge of front end of sample collecting means or of hollow needle
2222 side-walls of hollow needle
2223 first end of hollow needle
2224 second end of hollow needle
2225 hollow interior of hollow needle
2226 first opening of hollow needle
2227 second opening of hollow needle
2228 first part of hollow needle
223 back end of sample collecting means or reservoir
2231 side-walls of reservoir
2232 bottom of reservoir
2233 fist wall of reservoir, preferably opposite to bottom 2232 of reservoir
22331 first wall area of reservoir
22332, 22332' other wall areas of reservoir
23 fixing part by which hollow needle is attached to reservoir
231 channel of fixing part
232 orifice of fixing part
24 plate
25 shaft
251 distal end of shaft
2511 shoulder of distal end
252 axial channel of shaft
3 female part
31 receiving portion of female part
311 opening of receiving portion
32 sample container
321 second interior space
322 side-walls of sample container
323 bottom of sample container
324 opening of sample container
4 desiccant portion
41 solid desiccant body
5 tissue sample
6 insert body of hollow needle 222 in hollow interior 2225
7 first identifying means
8 second identifying means
9 third identifying means A particularly preferred embodiment of an ear tag according to the present invention is the embodiment wherein there is no sample container and wherein the sample collecting means comprises a hollow needle and a reservoir which may contain as an insert or an integral part the solid desiccant body, or the reservoir may be the solid desiccant body itself. In this embodiment, it is preferred that the hollow needle additionally comprises a so-called "insert body", which is an insert made from plastic or another suitable hard material which resides in the hollow interior of the hollow needle and frictionally engages therewith. Once the hollow needle has pierced out a tissue sample from the tissue of an animal which tissue sample then would come to lie at the first end of the hollow needle within the hollow interior thereof, it may be difficult to extract the sample from the hollow interior. This is where the insert body comes into play, in that it may be pushed from the other end towards the tissue sample and thereby may push the tissue sample out of the hollow needle. In order to access the insert body, one needs to possibly insert a rod through the second end of the hollow needle, i.e. the back end of the sample collecting means. To this end, preferably, the bottom of the reservoir and the first wall of the reservoir are constructed in such a manner that they can be easily pushed through by such a rod. For example, they may be made of a weakened plastic section, or they may be made of a thin foil which can be easily pushed through, such as a sealing foil or an aluminum foil.

The cross-section of the insert body is preferably such that the insert body frictionally engages with the hollow interior of the hollow needle but yet can still be moved upon application of force at one end of the insert body. Moreover, the cross-section has a shape which allows for liquid running through the hollow needle and passing by the insert body, so as to wash out or further process the tissue sample. In other words, the insert body allows for pushing the tissue sample out of the hollow needle and for adding processing agents, such as liquids, through the needle.

Moreover, reference is made to the figures wherein

FIG. 1 shows an embodiment of a male part of an ear tag showing first identifying means and a stem and the tip of said stem. Parts of the tip of the stem are made as a sample collecting means which sample collecting means, in the embodiment shown, also comprises a solid desiccant body as an integral portion thereof. The sample collecting means is detachably associated with the male part. The male part additionally also comprises first identifying means. From the back of the male part, there is a blind bore which allows to push the male part and, most prominently, the tip thereof and thus the sample collecting means through the ear of an animal. The sample collecting means itself has a sharp edge and a first interior space which serves to receive a sample of tissue when the sample collecting means is pressed through tissue.

Figure 2:
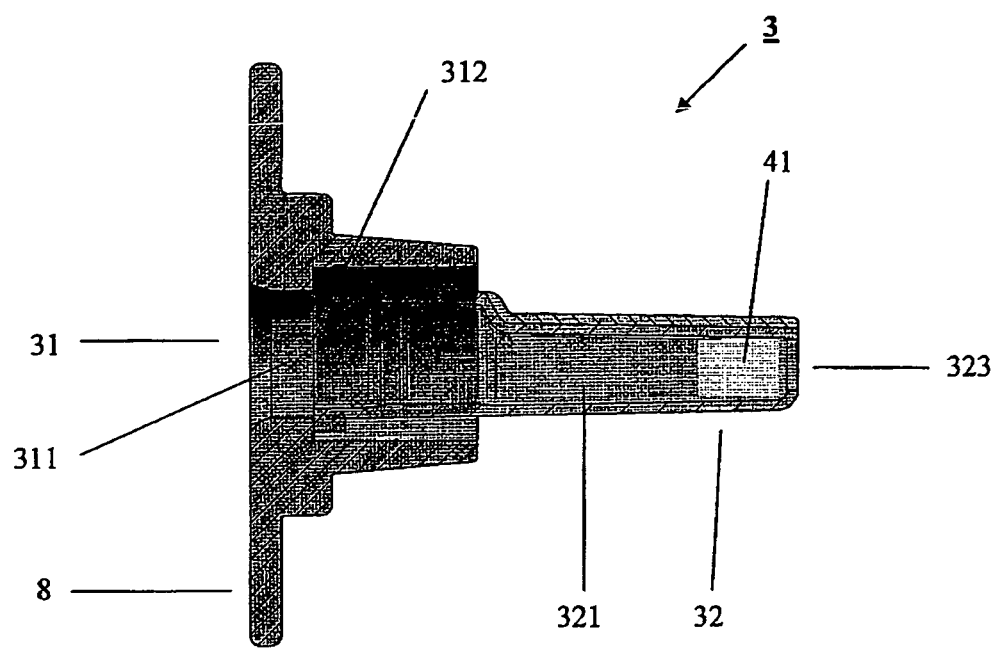

FIG. 2 shows an embodiment of a female part of an ear tag in accordance with the present invention, which female part, in this embodiment, also has second identifying means and a receiving portion for receiving the tip and at least parts of the stem of the male part, wherein the receiving portion further comprises a sample container which is in co-axial arrangement with the opening of the receiving portion. The sample container has an opening proximal to the opening of the receiving portion, which sample container opening is configured and seized so as to receive the tip of the stem of the male part and thus the sample collecting means. There may also be provided retaining means for retaining the tip in the sample container, but the tip may also simply be retained because of a snug fit into the opening of the sample container. The sample container is also detachable from the receiving portion of the female part by for example a material section that has a weakened cross-section. Once the tip and the sample collecting means have been inserted into the opening of the sample container, the assembly of sample collecting means and sample container become detached from the assembled ear tag and can be used for further processing. The sample container shown in FIG. 2 also contains an insert which is the solid desiccant body. The insert is shown in hatched lines proximal to the bottom of the sample container and has a tubular shape matching the dimensions of the second interior space of the sample container. Effectively, the solid desiccant body therefore lines parts of the second interior space. It should be noted that, with regard to FIGS. 1 and 2, it is sufficient if one solid desiccant body is present in either the sample collecting means or the sample container, but at least one of the two parts should have a solid desiccant body as an integral portion thereof or as an insert therein.

Figure 3:
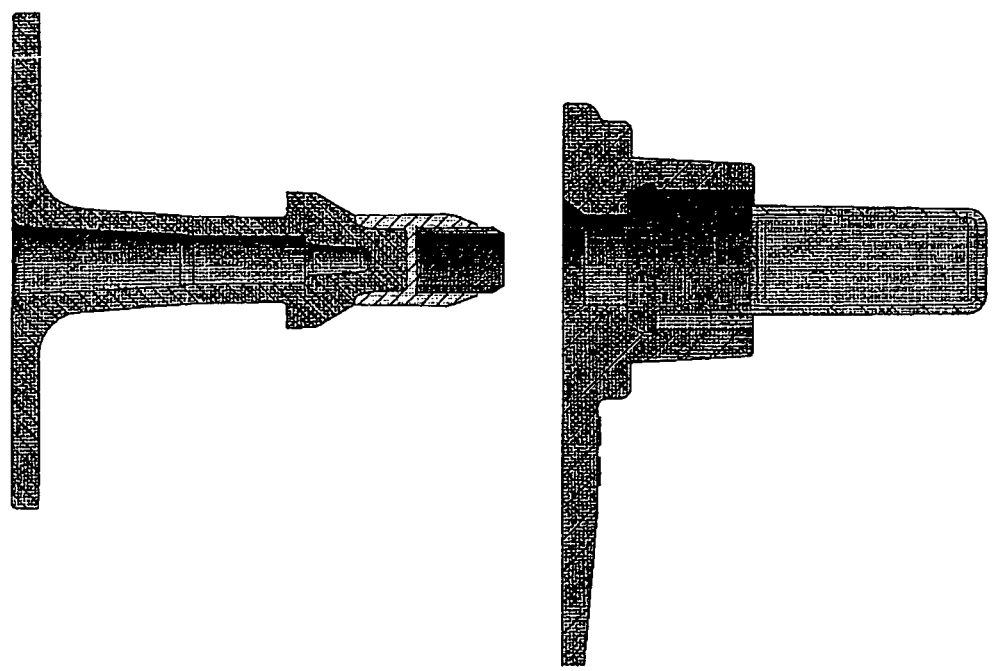

FIG. 3 shows the interaction that the male and the female part have when the ear tag is applied.

It should also be noted that the identifying means borne on the male and the female part should be identical, and the sample container may, of course, additionally have a print on it bearing the same information such that a tracing of the animal thus marked and sampled can be achieved.

Figure 4:
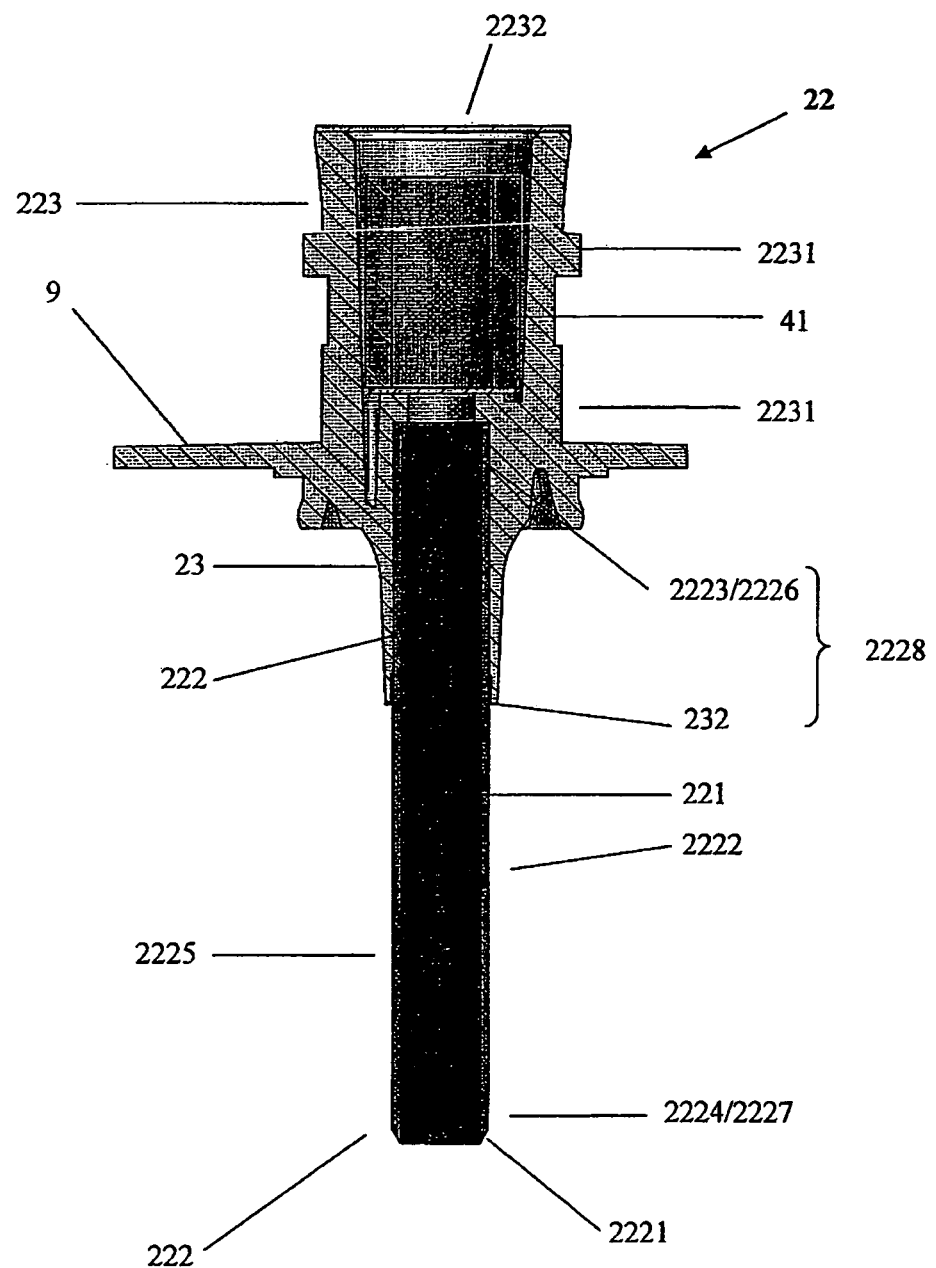

FIG. 4 shows another embodiment of a sample collecting means to be used in conjunction with a male part of an ear tag. The sample collecting means in this embodiment has a front end which is essentially configured as a hollow needle and a back end being configured as a reservoir for containing a desiccant. In the embodiment shown, there is a solid desiccant body configured as an insert which lines the interior of the third interior space which is the space defined by the sidewalls and the bottom of the reservoir and which is a subset of the first interior space which designates the entire space encompassed by the sample collecting means. The reservoir additionally contains a solid desiccant body as an insert shown in hatched lines and in cross-section. The insert has a tubular shape and fits into the reservoir. Additionally, the sample collecting means has third identifying means which bear the same information as the corresponding male part with which the sample collecting means is to be used and the female part of the ear tag. Additionally, the sample collecting means shown in FIG. 4 may have within the hollow needle an insert body of a cylindrical shape allowing the extraction of a tissue sample present in said hollow needle. In FIG. 4, such insert body and such tissue sample is, however, not shown.

Figure 5:
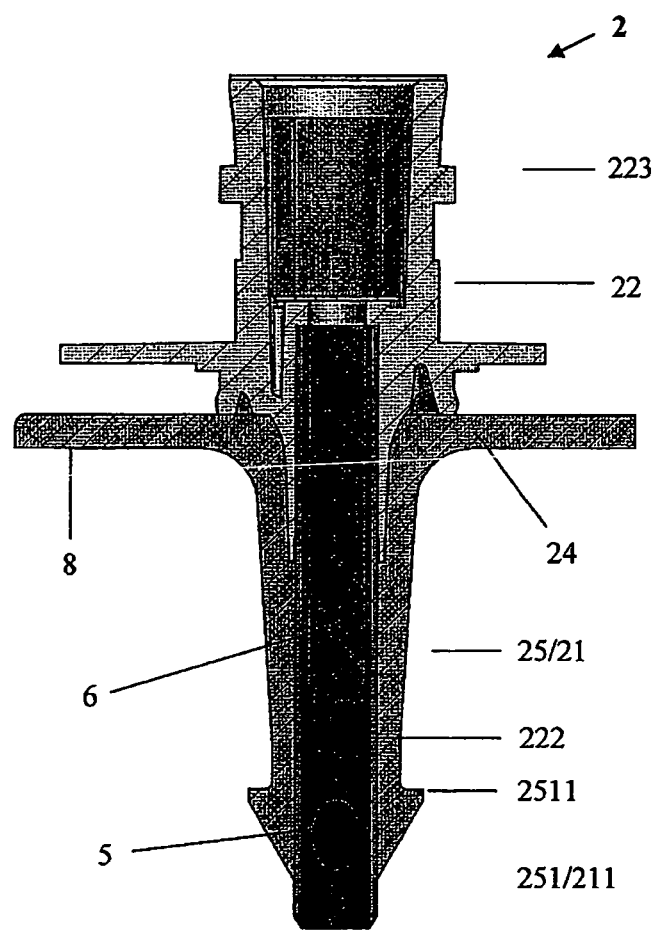

FIG. 5 shows an assembled male part using the sample collecting means of figure 4. The male part has a plate, a shaft or stem that emerges from the plate and ends in a head or tip having a shoulder which allows the locking of the male part in the interior of a female part of an ear tag. In the shaft, there is a channel which extends from the plate through to the head of the shaft and accommodates the needle of the sample collecting means of FIG. 4. The length of the shaft is dimensionally such that the hollow needle, when it is fully inserted into the shaft, projects with its second end, i.e. sharp end, from the head of the shaft and thereby allows the sampling of tissue when the head of the male part, i.e. the distal end of the shaft, together with the sample collecting means, is pressed through the ear of an animal into a female part of an ear tag. The plate of the male part as well as the sample collecting means according to the present invention furthermore has identifying means that carries information with regard to the identity of the animal thus marked and sampled. The identifying means of the sample collecting means and the male part (and the female part as well) according to the present invention may be visual means or it may consist of a transponder with electronic information. Also shown in FIG. 5 is an example of an insert body within the hollow needle that allows extraction of a tissue sample. The insert body has an overall cylindrical shape but has such a cross-section that allows to flow liquid through the hollow needle past the insert body which liquid may for example be used to further process the tissue sample or to simply flash out the tissue sample out of the hollow needle. Typical examples for such a cross-section are a cross-shaped, X-shaped or star-shaped cross-section.

The embodiment of the male part of an ear tag according to the present invention may be used with any female part that allows the locking of the shoulder of the shaft or stem of the male part within the female part.

After locking of the male part within the female part, the sample collecting means, which now contains a tissue sample, may be withdrawn and used for further processing. In preferred embodiments, the tissue sample is pushed out of the hollow needle using the insert body within the hollow needle which is pushed from the back end of the sample collecting means towards the front end using a rod-like or stick-like object. To this end, in preferred embodiments, the bottom of the reservoir and the wall opposite the bottom are weakened walls which may be easily penetrated by such rod-like or stick-like objects. Alternatively, the sample collecting means may be covered with a protective lid (not shown), and the solid desiccant body contained within the sample collecting means, either as an integral part or as an insert as shown in FIG. 4 may exert its desiccant effect for further storage.

In accordance with the present invention, a sample may thus be easily obtained from the tissue of an animal and may subsequently be stored under the influence of a desiccant material, without the sample deteriorating or degrading because of a solid desiccant body present within the sample collecting means in one embodiment, or in the sample container in another embodiment or in both, i.e. the sample collecting means and the sample container in yet a further embodiment.

The features of the present invention disclosed in the specification, the claims and/or in the accompanying drawings, may, both separately, and in any combination thereof, be material for realizing the invention in various forms thereof.

The invention claimed is:

1. An ear tag for marking an animal and for sampling tissue from said animal, comprising:
   a male part and a female part, said male part having a stem and a tip of said stem, said female part having a receiving portion for receiving said tip and at least parts of said stem upon application of the ear tag,
   said ear tag further comprising sample collecting means and, optionally, a sample container,
   wherein said sample collecting means is detachably associated with said male part prior to application of the ear tag, and wherein said sample container, if present, is detachably associated with said female part prior to application of the ear tag,
   wherein said sample collecting means has a first interior space for receiving a tissue sample, and said sample container, if present, has a second interior space for receiving a tissue sample,
   wherein said sample collecting means is configured such that it becomes pressed into or through tissue of an animal upon application of the ear tag to generate a tissue sample,
   wherein said ear tag, prior to application, further comprises a desiccant portion, said desiccant portion being associated with said sample collecting means or said sample container, said desiccant portion being made from a desiccant material shaped into a solid desiccant body,
   wherein, after application of the ear tag and sampling of tissue from the animal, said solid desiccant body and said sample collecting means, or said solid desiccant body and said sample container, are arranged such that at least one of said first interior space and said second interior space is exposed to said solid desiccant body, thereby allowing the desiccation of a tissue sample present within said first interior space or said second interior space,
   wherein said solid desiccant body is a unitary solid desiccant body which is not a powder of desiccant material and not a plurality of grains of desiccant material,
   wherein said solid desiccant body is integrated in said sample collecting means as an integral portion thereof, which does not come into direct physical contact with a tissue sample present in said sample collecting means, or wherein said solid desiccant body is formed as an insert which lines all or part of said first interior space, and said insert does not come into direct physical contact with a tissue sample present in said sample collecting means,
   wherein said sample collecting means, prior to application of said ear tag, is associated with said male part in a detachable manner such that upon application of said ear tag by introducing said tip and at least parts of said stem of said male part into said receiving portion of said female part, said sample collecting means is pressed into or through tissue of an animal, thereby generating a tissue sample within said first interior space, and,
   wherein said sample collecting means, after application of said ear tag, is detached from said male part together with said tissue sample within said first interior space by withdrawing it therefrom, said sample collecting means having a front end and a back end, said front end having a sharp edge, said sharp edge being configured to cut into tissue and generate a tissue sample which is received in said first interior space when said sample collecting means is pressed into or through tissue, said back end being a reservoir for containing a desiccant, said reservoir being or comprising said desiccant portion.

2. The ear tag according to claim 1, wherein said solid desiccant body is formed from a mixture of a binder and a desiccant material.

3. The ear tag according to claim 2, wherein said binder is a polymer, and said desiccant material is entrained in said polymer.

4. The ear tag according to claim 3, wherein said polymer is a naturally occurring polymer, such as starch, cellulose, or a modified form thereof, such as pre-gelatinized starch, or is a thermoplastic polymer, preferably a polyolefin, such as polypropylene, polyethylene, or a polycarbonate or a polyamide.

5. The ear tag according to claim 4, wherein said polymer is a thermoplastic polymer and wherein said solid desiccant body is formed from said thermoplastic polymer, said desiccant material and additionally a channeling agent, wherein said channeling agent is an agent that allows for access of moisture to said desiccant material within said thermoplastic polymer.

6. The ear tag according to claim 5, wherein said channeling agent is selected from polyglycol, glycerol, ethylene vinyl alcohol and polyvinyl alcohol.

7. The ear tag according to claim 1, wherein said desiccant material is an anhydrous salt or a material having capillary morphology.

8. The ear tag according to claim 1, wherein said solid desiccant body has a curved shape or a tubular shape or a shape matching said first or said second interior space.

9. The ear tag according to claim 1, wherein said reservoir has side-walls and a bottom defining a third interior space which is a subset of said first interior space, and said solid desiccant body is integrated into said side-walls of said reservoir and said bottom of said reservoir, or said solid desiccant body is formed as an insert which lines all or part of said third interior space, or said solid desiccant body makes up said reservoir.

10. The ear tag according to claim 1, wherein said front end of said sample collecting means is a hollow needle having side-walls, a first end and a second end, said hollow needle being attached to said reservoir with said first. end at a first wall of said reservoir, said hollow needle having a sharp edge at said second end, which sharp edge is identical with said sharp edge of said front end of said sample collecting means, said hollow needle further having a hollow interior ending in a first opening and a second opening at said first end and second end, respectively, wherein said first wall of said reservoir comprises a first wall area that is configured so as to be pierced through by said first end of said hollow needle upon pressing said sample collecting means into tissue.

11. The ear tag according to claim 10, wherein said first wall area
    has a thickness which is at least partially smaller than other wall areas adjacent to or surrounding said first wall area, or
    is weakened by perforation or by a groove or by a side to be ruptured by said first end of said hollow needle.

12. The ear tag according to claim 10, wherein said hollow needle is attached with said first end to said reservoir at said first wall of said reservoir by means of a fixing part, said fixing part having a channel extending from said first wall and ending in an orifice, said channel having dimensions so as to hold a first part of said hollow needle including said first end of said hollow needle, said hollow needle being held at said first part by said channel.

13. The ear tag according to claim 12, wherein said channel has an inner diameter that matches an outer diameter of said hollow needle at said first part of said hollow needle, wherein said hollow needle, at said first part, frictionally engages with said channel, and, upon pressing said sample collecting means into tissue, is moved with its first end towards said first wall area and pierces through said first wall area by means of said first end.

14. The ear tag according to claim 10, wherein said reservoir and said fixing part are made from plastic.

15. The ear tag according to claim 10, wherein said first wall is made from plastic and is also made by molding during molding of the reservoir, or said first wall is made from a thin foil and is applied to said reservoir after production of said reservoir.

16. The ear tag according to claim 12, wherein said fixing part is made integral with said reservoir.

17. The ear tag according to claim 12, wherein said fixing part is made separately from said reservoir and is connected thereto in a second step.

18. The ear tag according to claim 10, wherein said hollow needle is made from metal.

19. The ear tag according to claim 10, wherein said hollow needle has a longitudinal axis extending between said first end and said second end, said longitudinal axis being perpendicular to said first wall of said reservoir.

20. The ear tag according to claim 12, wherein said hollow needle is being held perpendicular to said first wall of said reservoir by means of said channel of said fixing part.

21. The ear tag according to claim 10, wherein said hollow needle comprises an insert body in its hollow interior which frictionally engages with said side-walls of said hollow needle but which can be moved within and out of said hollow interior upon exertion of pressure to said insert body, thereby also moving a tissue sample, present within said hollow interior, within and out of said hollow interior of said needle.

22. The ear tag according to claim 21, wherein said insert body has a longitudinal axis which is parallel to a longitudinal axis of said hollow needle extending between said first end and said second end and being perpendicular to said first wall of said reservoir, and wherein said insert body has a cross-section perpendicular to said longitudinal axis which cross-section allows liquid to pass through said hollow needle from said first end to said second end.

23. The ear tag according to claim 22, wherein said cross-section is circular or semi-circular or oval or cross-shaped.

24. The ear tag according to claim 22, wherein said insert-body has the shape of a cylinder having a circular or oval cross-section or has the shape of a column having a cross-shaped or X-shaped or star-shaped cross-section.

25. A method of applying an ear tag to an animal and taking a sample from said animal, comprising the steps:
providing a male and a female part of an ear tag as defined in claim 1,
applying said male and female part to an ear of an animal and applying thus an ear tag in said ear and thereby obtaining a tissue sample, either in the first interior space of said sample collecting means, in the hollow interior of said hollow needle of said sample collecting means, or in the second interior space of said sample container,
either, detaching said sample container including said tissue sample from said female part, or, withdrawing said sample collecting means from said male part of said ear tag.

\* \* \* \* \*